Patented Apr. 21, 1925.

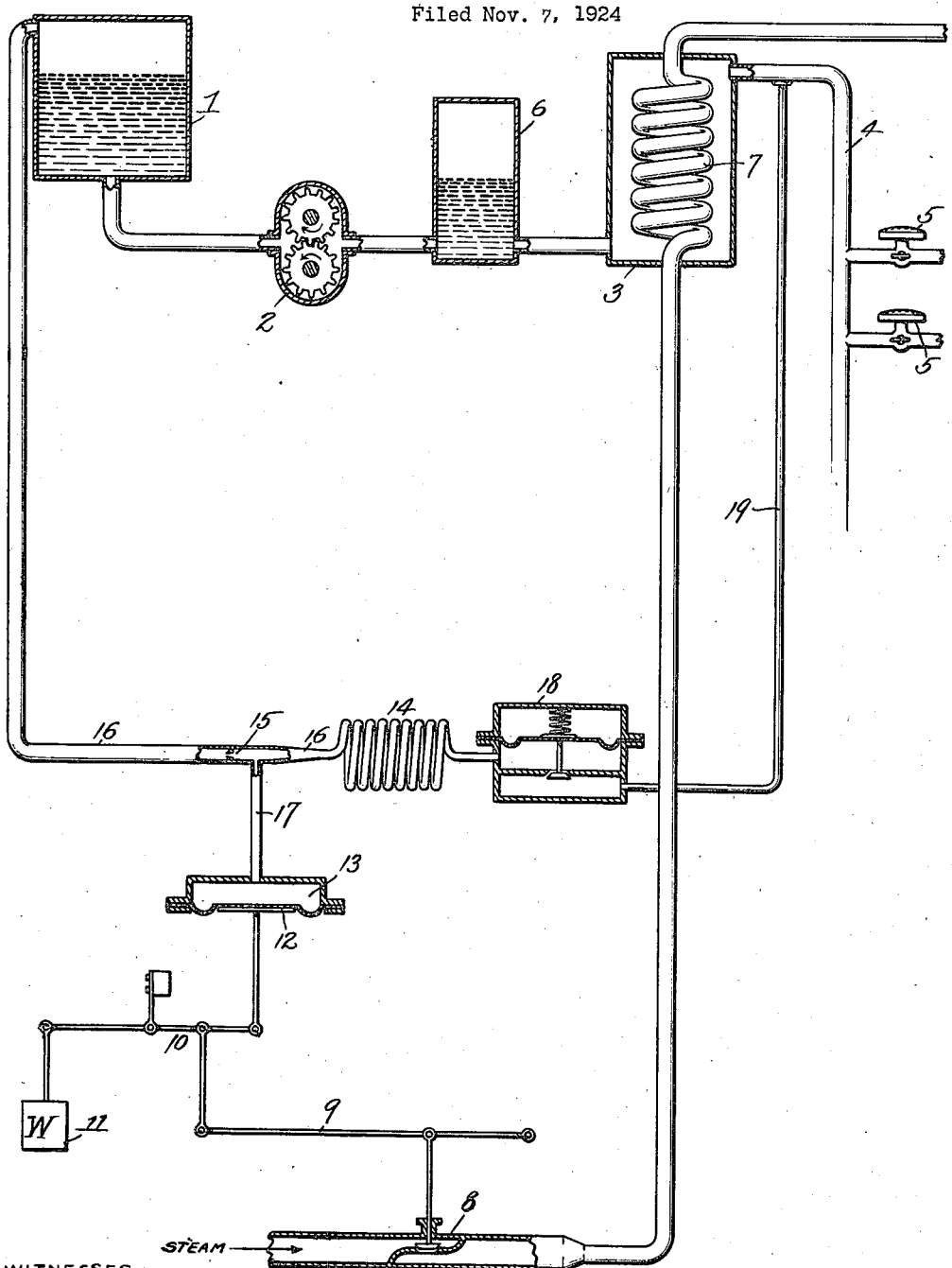

1,534,091

UNITED STATES PATENT OFFICE.

CHARLES H. SMOOT, OF MAPLEWOOD, NEW JERSEY.

VISCOSITY REGULATOR.

Application filed November 7, 1924. Serial No. 748,438.

*To all whom it may concern:*

Be it known that I, CHARLES H. SMOOT, a citizen of the United States, and a resident of Maplewood, county of Essex, State of New Jersey, have invented certain new and useful Improvements in Viscosity Regulators, of which the following is a specification.

This invention relates to means for regulating the viscosity of fluids and has for its object the maintenance of an approximately constant viscosity in order that interference with other regulating devices will not be hampered in the accuracy of their operation by variations of this function. More specifically, the object of the invention is the maintenance of a uniform viscosity in fuel oil, to the end that the flow of oil to the burners will not be subject to fluctuations due to variations in viscosity. The invention comprises means responsive to changes in viscosity, whereby control is had over a heating means for heating the fluid. If the viscosity increases, the device will apply more heat to the fluid, thereby lowering its viscosity and bringing it back to normal or approximately so.

The accompanying drawing illustrates an embodiment of my invention in diagrammatic form. An oil tank 1 supplies oil to a pump 2, which delivers it to a heating chamber 3, from whence it flows through pipe 4 to burners 5. A surge tank 6 may be interposed to steady the flow. In the heating tank 3 is a heating coil 7 supplied with steam through a valve 8. This valve is opened and closed through the medium of levers 9 and 10. A weight 11 is applied to this lever system so as to press up against diaphragm 12, closing a chamber 13, which is connected to a device that is sensitive to changes in viscosity. This device consists of a long coil 14 that will offer considerable resistance to the passage of the viscous fluid on account of the skin friction of the great area of surface exposed as compared with the volume passed. At 15 is shown a restricted orifice in the pipe 16. This orifice will offer a resistance to the fluid which will be negligibly affected by the viscosity, the resistance being largely dynamic. The pipe 16 discharges the oil that has been used for testing the viscosity back to the tank 1. At a point in the pipe 16 between the coil 14 and the restriction 15, a pipe 17 leads to the chamber 13. The coil 14 is connected by a suitable reducing valve 18 with the oil that is being delivered to the burners through a pipe 19. The reducing valve will insure the delivery of oil to the long coil at a constant pressure. Since the oil is delivered to the coil 14 at constant pressure, the reduction of pressure due to its viscosity in passing through the coil will result in a resultant pressure in the pipe 16 proportional to its viscosity, which will cause a corresponding fluctuation on the diaphragm 12 and chamber 13, resulting in an opening or closing of the valve 8, thereby varying the amount of steam delivered to the heater 7, which in turn will cause the variation in the temperature of the oil to reduce the viscosity to normal. As the viscosity is reduced, the resistance applied at the restricted orifice 15 comes more into play and the pressure in pipes 16 and 17 increases with a corresponding increase in the pressure on diaphragm 12, which will result in partially closing the steam valve 8, cutting off some of the steam supplied to heating coil 7, thereby preventing a further reduction in the viscosity. By these means a substantially uniform viscosity may be maintained—a point of very great importance in modern furnace regulation as the regulators employed to govern the supply of fuel oil are not expected to take account of variations in viscosity. While I have shown one embodiment of my invention, I do not wish to be restricted specifically thereto, as there are many other ways that will be evident to those skilled in the art to bring about similar combinations. For example, an electric heater instead of the steam heater might be employed to heat the fluid and other means than those shown, that would be sensitive to changes in viscosity, may be used.

I claim:—

1. The method of regulating the viscosity of a fluid, which consists in heating the fluid, passing the fluid through a device responsive to variations in viscosity, and controlling the amount of heat supplied to the fluid in accordance with such changes in viscosity.

2. The method of regulating the viscosity of a fluid, which consists in passing the fluid through a heater, then at least a part of the fluid through a long restricted passage, and then causing the force of the fluid to act against a balancing resistance to effect changes in the supply of heat to the heater to bring the viscosity back to normal.

3. The method of regulating the viscosity of fuel oil, which consists in passing the oil through a heater and from thence at least a part of the oil through a long restricted conduit, to reduce its pressure in proportion to its viscosity and then causing the oil to act against a balancing force to control the supply of heat to the heater.

4. The method of regulating the viscosity of a fluid, which consists in heating the fluid, passing the fluid through a viscosity-sensitive conduit and thence through a resistance less sensitive to viscosity, and at an intermediate point causing the fluid to act against a balancing force to regulate the supply of heat to the heater.

5. In a device of the character described, the combination comprising means for supplying fluid, a heater for said fluid, means sensitive to changes in viscosity of the fluid leaving the heater, and means controlled by said sensitive means for regulating the supply of heat to the heater.

6. In a device of the character described, the combination comprising means for supplying fluid, a heater for said fluid, means for opposing resistance to the passage of the fluid proportional to its viscosity, means responsive to the pressure of the fluid at a point beyond said viscosity resistance means, for increasing the heat supply to the heater, and means for reducing the heat supply upon reduction of the viscosity.

7. In a device of the character described, the combination comprising means for supplying fluid, a heater for said fluid, a conduit through which the fluid passes after leaving the heater, two restrictions in the conduit, the one nearer the heater having a greater surface than the other to respond more sensitively to changes in viscosity of the fluid, and means responsive to the pressure of the fluid at a point intermediate the two resistances for varying the heat supply to the heater.

CHARLES H. SMOOT.